United States Patent [19]

Bae

[11] Patent Number: 5,739,878
[45] Date of Patent: Apr. 14, 1998

[54] LIQUID CRYSTAL DISPLAY HAVING COMMON ELECTRODE WITH PORTIONS REMOVED AT THIN FILM TRANSISTORS

[75] Inventor: Byung-seong Bae, Suwon, Rep. of Korea

[73] Assignee: Samsung Electronics Co., Ltd., Suwon, Rep. of Korea

[21] Appl. No.: 612,780

[22] Filed: Mar. 8, 1996

[30] Foreign Application Priority Data

Apr. 13, 1995 [KR] Rep. of Korea .............. 95-8665

[51] Int. Cl.$^6$ .............. G02F 1/136; G02F 1/1343
[52] U.S. Cl. .............. 349/42; 349/43; 349/139
[58] Field of Search .............. 349/42, 43, 96, 349/138, 139, 143

[56] References Cited

U.S. PATENT DOCUMENTS

| | | | |
|---|---|---|---|
| 4,867,537 | 9/1989 | Aoki et al. | 349/139 |
| 5,084,905 | 1/1992 | Sasaki et al. | 349/43 |
| 5,187,604 | 2/1993 | Taniguchi et al. | 349/42 |
| 5,309,264 | 5/1994 | Lien et al. | 349/143 |
| 5,608,556 | 3/1997 | Koma | 349/42 |
| 5,663,777 | 9/1997 | Aoyama | 349/96 |
| 5,668,379 | 9/1997 | Ono et al. | 349/43 |
| 5,668,649 | 9/1997 | Suzuki et al. | 349/42 |

Primary Examiner—Anita Pellman Gross
Assistant Examiner—Tarifur R. Chowdhury
Attorney, Agent, or Firm—Cushman Darby & Cushman IP Group of Pillsbury Madison & Sutro, LLP

[57] ABSTRACT

An LCD device with reduced off-current comprising one glass substrate on which a TFT array, a first ITO common electrode and data gate line are formed, a confronting glass substrate joined to the other glass substrate and on which a color filter array and a second ITO common electrode are formed, and a liquid crystal poured between the joined glass substrates. Part of the second ITO common electrode positionally corresponding to a respective TFT is eliminated, thereby preventing electrons from gathering on the upper surface of the thin film transistor (TFT).

2 Claims, 4 Drawing Sheets

LIQUID CRYSTAL DISPLAY HAVING COMMON ELECTRODE WITH PORTIONS REMOVED AT THIN FILM TRANSISTORS

BACKGROUND OF THE INVENTION (1) Field of the Invention

The present invention relates to a liquid crystal display (LCD), and a fabrication method thereof. The present invention particularly relates to an LCD device with reduced source/drain off-current because an upper part of a thin film transistor (TFT) of an ITO common electrode covering the confronting glass substrate is eliminated, preventing electrons from gathering on the upper surface of the TFT. Also, The present invention provides a high quality picture by lowering the resistance of a ITO common electrode.

(2) Description of Related Art

In order to meet the current demand for light weight and compactly constructed electronic products, research and development of LCDs as a substitute for cathode ray tubes (CRT) has increased.

Among various types of flat displays, an LCD is capable of being driven with low-voltage and low-power and is therefore driven with a large scale integration (LSI) driver. In addition, because the LCD is thin and light, manufacturers have made efforts to develop and simplify methods of production.

Presently, the active matrix liquid crystal display (AMLCD) using TFTs as switching circuits is popular because of its portability and excellent picture image.

In the AMLCD panel, many electrode lines are laid horizontally and vertically, and pixel elements are formed at each cross section thereof. At each pixel, a TFT for controlling signal voltage is provided. Each TFT is comprised of thin films, such as amorphous silicon formed on glass substrates.

A gate electrode of the TFT is connected to the horizontal line, one electrode of the source/drain electrodes is connected to the vertical line to which an image signal voltage is input, and the other electrode of the source/drain electrodes is connected to an ITO common electrode of the pixel. Therefore, once a signal voltage is input to the horizontal line, thereby turning on the TFT, the image signal voltage is applied to the ITO common electrode through the TFT and the liquid crystal between other electrodes having the TFT, so that brightness can be controlled in combination with a light polarizing plate.

One advantage of the LCD is that only a pixel which inputs a signal by driving the transistor of each pixel is turned on, so crosstalk is not generated.

While a TFT is not selected, the signal voltage stored in the pixel should be preferably suspended. However, an off-current flows through various lines, so the signal voltage changes. To minimize this change in the signal voltage, a storage capacitor is formed in parallel with the pixel electrode. Since the storage capacitor is fabricated with a thin film on each pixel of the TFT LCD, a mark is suspended for a non-selected period by storing an electric charge thereupon.

The AMLCD panel should preferably have excellent optical features, high contrast, low flicker, and no image-ghosting phenomenon.

To meet these requirements, the required operational characteristics required for each pixel are as follows:

(a) pixel charging/discharging time:

The signal should be sufficiently used in the pixel for a given time. This relates to power capacity of the pixel, signal applying voltage and the characteristics of a turned-on switching circuit.

(b) signal delay:

It cause insufficient charging/discharging of the pixel by perverting a signal for the delay of delivering a gate voltage or a data signal voltage. Resistance of each signal line and parasitic capacitance should be taken into consideration.

(c) suspending a signal voltage:

A pixel should suspend the signal voltage during an off-time period. To this off-resistance of a switching circuit, Resistance of the liquid crystal and total electric capacitance of the pixel are related to this off-resistance of the switching circuit.

(d) reduction of parasitic capacitance:

Parasitic capacitance of the switching circuit is a primary cause of change in the level of a signal voltage to a pixel. Accordingly, it is necessary to reduce this parasitic capacitance or to maximize capacitance of the pixel.

The total capacitance of a pixel is the sum total of electric capacitance of the liquid crystal formed between a pixel electrode and an opposite electrode, electric capacitance of a storing capacitor, and parasitic electric capacitance of a respective TFT. The signal stored on the pixel during an off-time period of the TFT is lost by various routes of off-current. Of these off-current paths, off-current of the TFT is significant. If this off-current is large enough to reduce the off-resistance, the voltage stored on the pixel is affected by the voltage of the data line. Subsequently, display quality may deteriorate because vertical crosstalk may be generated.

When the switching circuit of the display is fabricated with an amorphous silicon, a large optic current in the amorphous silicon occurs. Also, the power current abruptly increases when the temperature rises. To solve these problems, decreasing the thickness of the amorphous silicon layer has been proposed to decrease the optic current. Additionally, in order to reduce the off-resistance, it is possible to increase the off-current of the TFT by raising the voltage applied to the ITO common electrode of the color filter glass substrate, which is opposite the confronting glass substrate on which the TFT in formed.

With reference to the drawings, the structure of a conventional LCD is described below.

As illustrated in FIG. 1, the channel of a typical TFT of the LCD is formed at a gate insulator film 12 and the surface of the silicon layer 14. The source/drain electrodes 16 are formed on the silicon layer 14. When an amorphous silicon is used, a typical structure is located below the gate electrode 18. A bottom-gate type is widely used. The ITO common electrode 17 is covered with a protective insulator film 20. An insulating film 22 is formed over the protective film 20 to reverse bias the liquid crystal. Thereupon, a liquid crystal layer 24 is provided at regular intervals. A second insulating film 26 is located above the liquid crystal layer 24 to also reverse bias the liquid crystal. A second ITO common electrode 28 is formed on the second insulating film 26, structurally below a confronting glass substrate 34. A constant voltage is applied to second ITO common electrode 28 which can be changed regularly. At this time, the gate voltages applied to the second ITO common electrode 28 cause electrons to gather on the upper surface of the TFT, causing an increase in current. At this time, if the gate voltages applied to the second ITO common electrode 28 are increased, a channel is formed on the upper surface of the TFT and turned on. The voltages applied to the second ITO common electrode 28 should be high, since the second ITO common electrode 28 is relatively distant from the upper surface of the TFT. However, the contact resistance between the channel and the source/drain electrodes is typically reduced and hence the on-current is increased.

FIG. 2 illustrates variations in the source/drain current for gate voltages applied to the second ITO common electrode of the color filer substrate.

As illustrated in FIG. 2, the source/drain current increases relative to an increase in gate voltage. Accordingly, in a conventional LCD, a pixel voltage is affected by change in the data voltage during an off-time period. Therefore, the image quality deteriorates because of vertical crosstalk.

SUMMARY OF THE INVENTION

An object of the present invention is to solve the problem (s) of the related art and to provide an LCD device with a reduced source/drain off-current by eliminating part of the ITO common electrode covering the confronting glass substrate, which prevents electrons from gathering on the upper surface of the TFT, and is to provide a high quality picture by lowering the resistance of a ITO common electrode. Another objective of the present invention is to provide a fabricating method of such an LCD device.

To achieve these objects, an LCD according to the present invention comprises a first glass substrate on which a TFT array, first ITO common electrodes, and data gate line are formed, a second, confronting glass substrate on which a color filter array and second ITO common electrodes are formed. According to the present invention, a part of the ITO common electrode on the second substrate which corresponds to the TFT is eliminated. A liquid crystal is provided between the first and second glass substrates.

The fabricating method of the LCD of the present invention comprises a step of eliminating part of the ITO common electrode corresponding to the TFT.

DETAILED DESCRIPTION OF THE PREFERRED EMBODIMENT

With reference to the drawings, a preferred embodiment of the invention is described below.

Figure 1:
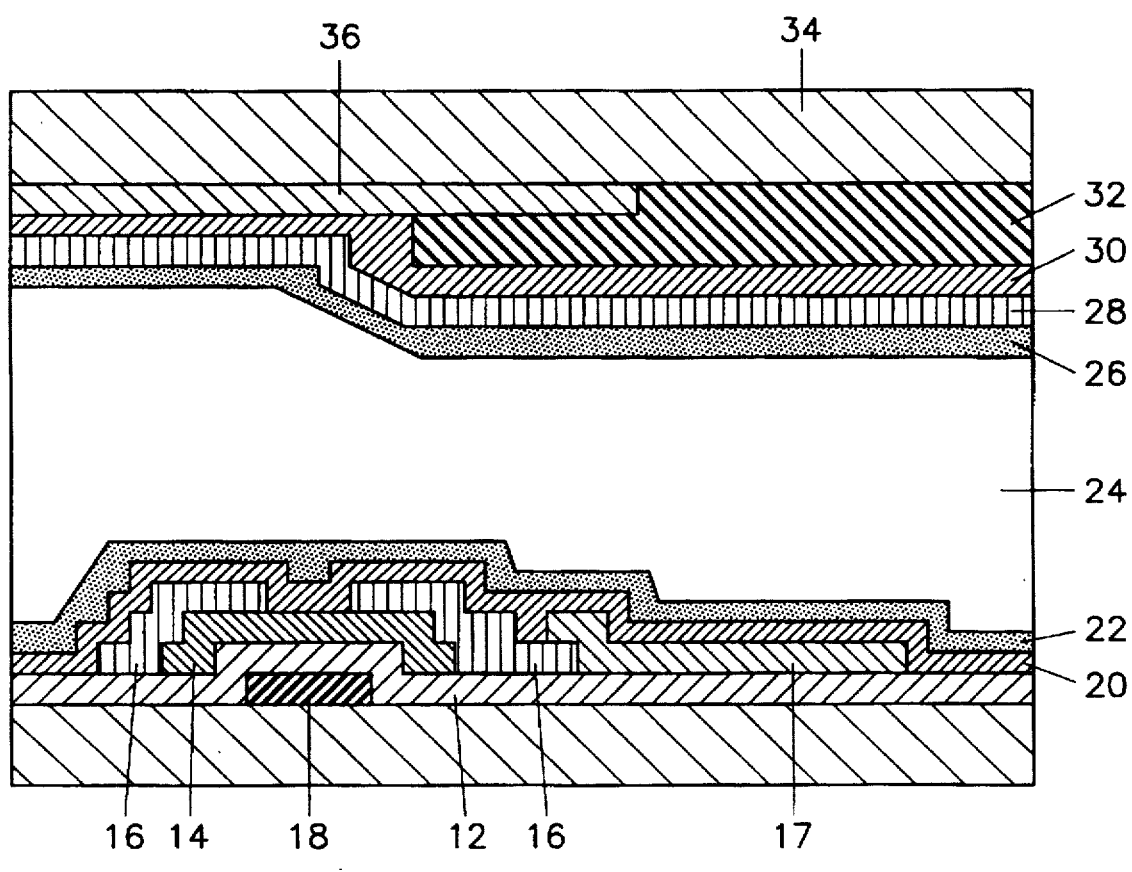
FIG. 1 is a cross-sectional view showing a conventional LCD structure.
Figure 2:
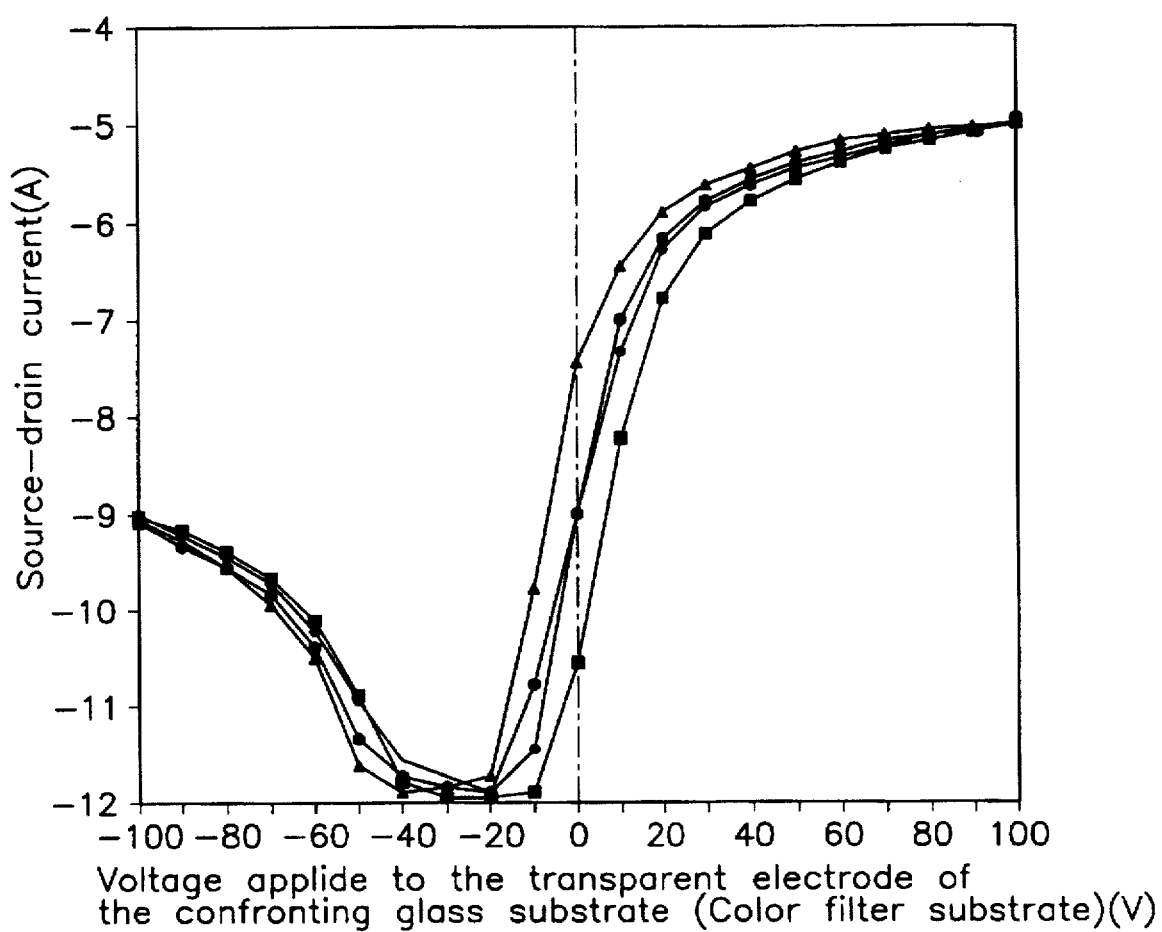
FIG. 2 is a graph showing a relationship between source/drain current and variation of the voltage applied to an ITO common electrode on the second, confronting glass substrate in a conventional AMLCD.
Figure 3:
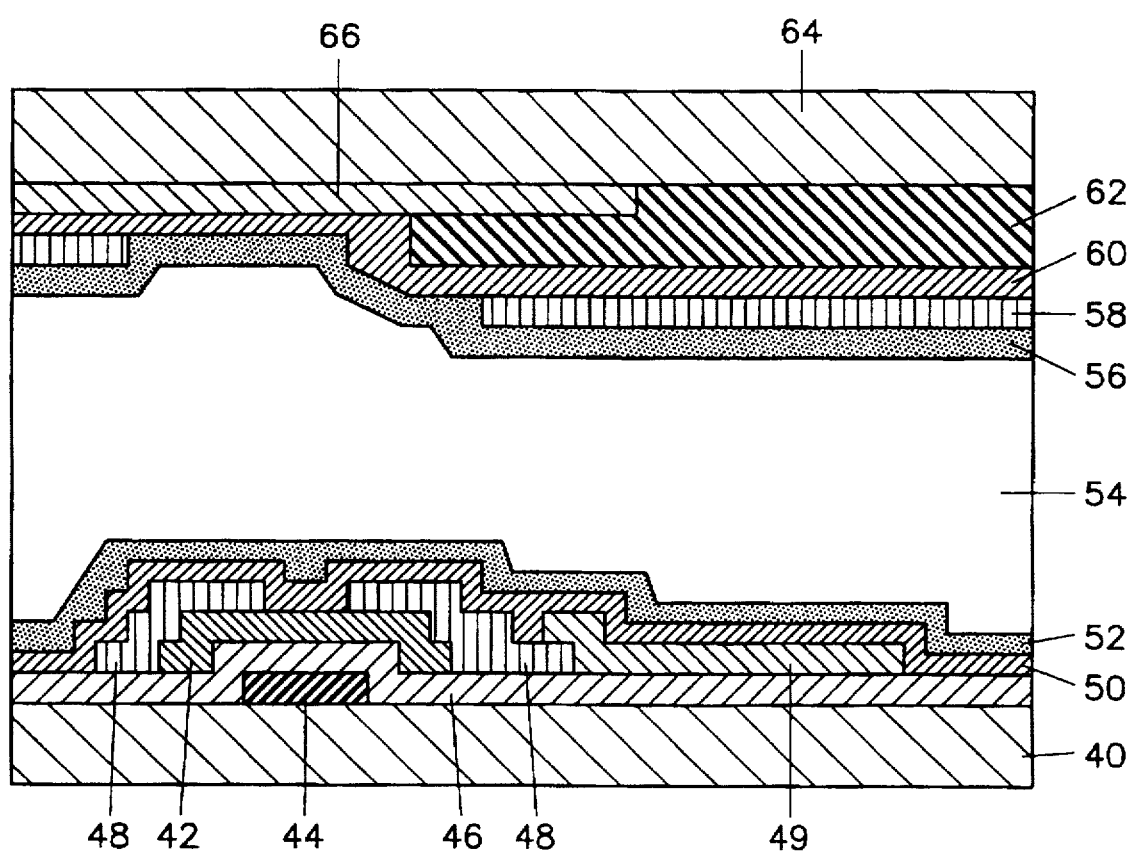
FIG. 3 is a cross-sectional view showing an LCD structure according to a preferred embodiment of the present invention.

As illustrated in FIG. 3, the LCD according to a preferred embodiment of the invention comprises a first substrate 40 on which is formed a gate electrode 44. A gate insulator layer 46 covers the gate electrode 44. A silicon layer 42 is formed on the gate insulator layer 46, at a location thereon substantially corresponding to the gate electrode 44. Source/drain electrode 48 is formed on the gate insulator layer 46 and covers a portion of silicon layer 42. A protective layer 50 is formed over the ITO common electrode 49 and a remaining portion of the silicon layer 42. A reverse biasing layer 52 covers the protective layer 50.

A black matrix layer 66 is formed on a portion of a second, confronting substrate 64 opposite the first substrate 40. A color filter 62 is formed on another portion of second substrate 64, and may cover a portion of the black matrix layer 66. A protective layer 60 is formed over second substrate 64 and over color filter 62 and black matrix layer 66 formed thereon. ITO common electrode 58 is formed on the protective layer 60. A second reverse biasing layer 56 is formed over the protective layer 60, including ITO common electrode 58.

The first and second substrates 40 and 64, with their respective structures formed thereon, are then conventionally joined together in opposition. This forms a space therebetween in which a liquid crystal 54 is provided.

According to the present invention, a part of ITO common electrode 58 is eliminated from a portion of the second substrate structure corresponding to the TFT structure on the first substrate 40. Accordingly, although a constant voltage is applied to the ITO common electrode 58 and the gate electrode 44, electrons do not gather on the upper surface of the TFT.

In the conventional structure, if the gap between the substrates in which the liquid crystal is provided is reduced, the distance between the second substrate and the TFTs is reduced. Therefore, a channel can form at a low voltage. However, such a channel is not formed in the present invention and the effect becomes longer.

Figure 4:
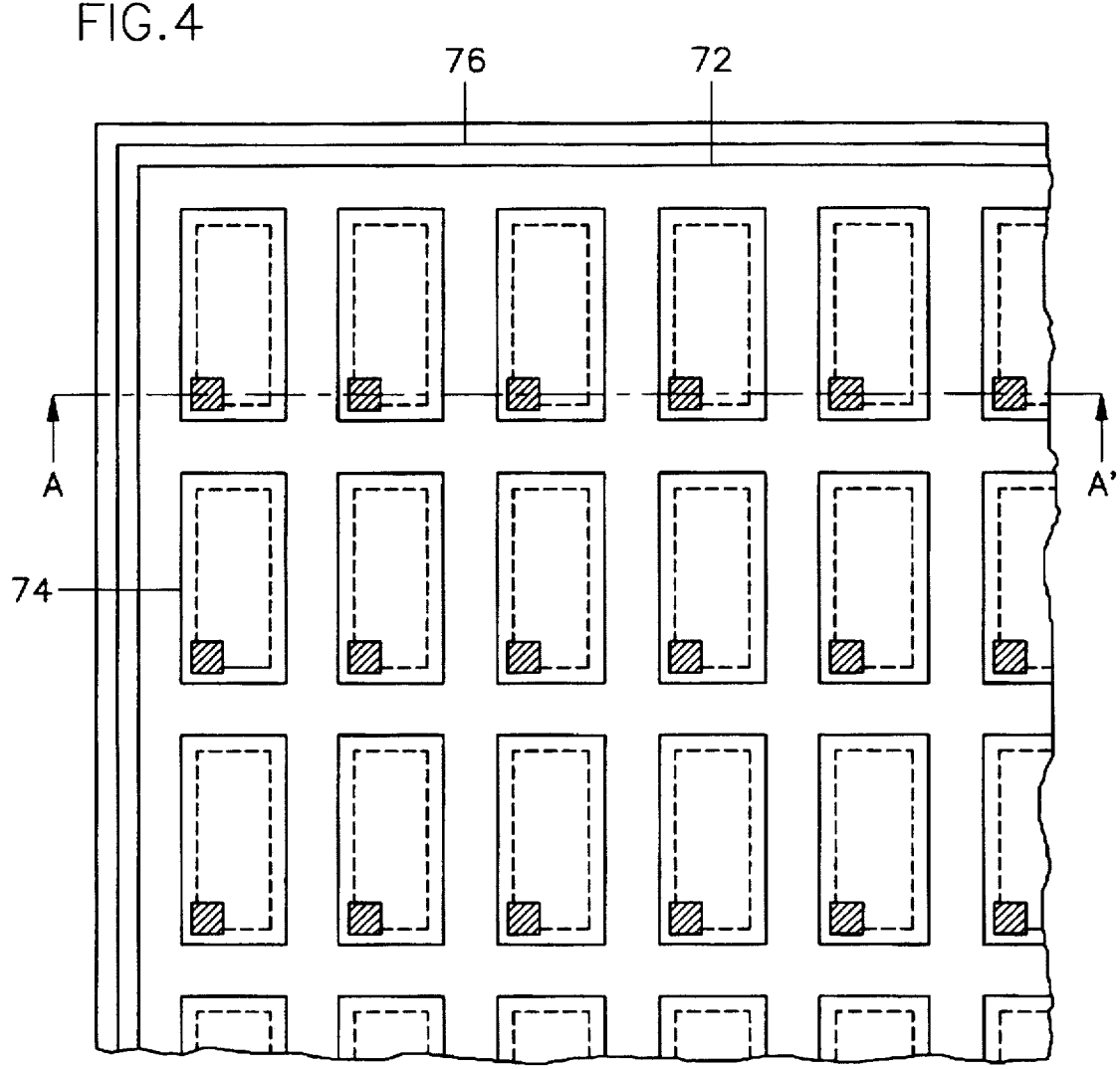
FIG. 4 is a plan view of a color filter substrate of the LCD, according to another embodiment of the present invention.
Figure 5:
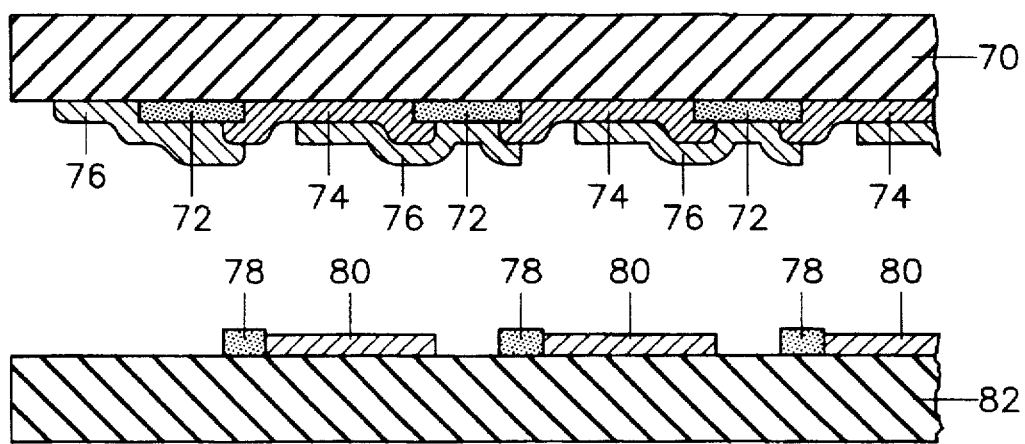
FIG. 5 is a cross-sectional view of taken along A-A' of FIG. 4.

FIGS. 4 and 5 show a state in which the ITO common electrode is not formed by being etched in the color filter substrate of the LCD according to another embodiment of the invention.

A black matrix layer 72 is formed on a portion of a second substrate 70 opposite a first substrate 82. A color filter 74 is formed on another portion of second substrate 70, and may cover a portion of the black matrix layer 72. An ITO common electrode 76 is formed on the color filter 74. And, a TFT 78 is formed with contact of a pixel electrode on the substrate 82.

As shown in FIGS. 4 and 5, the LCD device in accordance with another embodiment of the present invention provides a high quality picture by lowering the resistance of the ITO common electrode 76 with contact of a black matrix layer 72.

As described above, an LCD device with reduced off-current of source/drain electrodes is provided. This is realized by eliminating a portion of the ITO common electrode on a second substrate corresponding to a TFT circuit on a first substrate. This prevents electrons from gathering on the upper surface of the TFT. The method for manufacturing such an LCD device is also provided.

What is claimed is:

1. A liquid crystal display device, comprising:
   a first substrate on which an array of thin film transistors, a first ITO electrode, and a gate line are formed;
   a second substrate on which an array of color filters and a second ITO electrode are formed, wherein said first and second substrates are joined so as to define a space therebetween; and
   a liquid crystal provided in said space between said joined first and second substrates.

wherein at least one portion of said second ITO electrode, positionally corresponding to a thin film transistor of said array of thin film transistors, is removed.

2. A method for manufacturing a liquid crystal display device, comprising the steps of:

providing a first substrate having an array of thin film transistors, a first ITO electrode, and a gate line formed thereon;

providing a second substrate having an array of color filters and a second ITO electrode formed thereon;

removing at least one portion of the second electrode positionally corresponding to a thin film transistor on the first substrate;

joining the first and second substrates such that a space is defined therebetween; and depositing a liquid crystal in the space defined between the joined first and second substrates.

\* \* \* \* \*